United States Patent Office 3,429,839
Patented Feb. 25, 1969

3,429,839
EPOXY POLYMER DERIVED POLYMERS CONTAINING QUATERNARY PHOSPHONIUM GROUPS
Simone Franco, Casalgrasso, Cuneo, Italy, assignor to Ferrania S.p.A., Milan, Italy
No Drawing. Filed Mar. 29, 1966, Ser. No. 538,245
Claims priority, application Italy, Apr. 23, 1965, 16,333/65, Patent 767,082
U.S. Cl. 260—8     10 Claims
Int. Cl. C08f 3/66, 29/50

ABSTRACT OF THE DISCLOSURE

Polymers having a plurality of quaternary phosphonium groups and having utility in the photographic art are prepared by the quaternization of tri-substituted phosphines with polymers containing a plurality of 1,2-epoxy groups.

---

This invention relates to a process for the preparation of polymeric compounds containing recurring quaternary phosphonium units and to the polymeric products obtained thereby.

Various methods have been used to prepare polymeric quaternary phosphonium salts. The reaction of a secondary phosphine and a vinyl derivative in the presence of a free radical yielding initiator is described in British Patent No. 898,759. The process of U.S. 3,068,214 utilizes the reaction of tri-substituted phosphines with copolymers of ar-substituted haloalkylstyrenes and an acrylamido monomer, and U.S. 3,065,272 teaches the polymerization of vinyl aromatic monomers containing quaternary phosphonium groups in the presence of free radical yielding initiators. In J. Pol. Sci., 59, 379–387 (1962) triphenyl phosphine is reacted in the presence of AlCl$_3$ with chloromethylation products of styrene copolymers. The reaction of vinyl esters of halo-substituted acid with trialkyl phosphine and subsequent polymerization is described in U.S. 3,125,555.

It is an object of this invention to provide new polymeric compounds containing quaternary phosphonium groups.

Another object of this invention is to prepare polymers containing quaternary phosphonium groups from epoxy polymers.

Still another object of this invention is to provide polymers having both epoxy groups and appended quaternary phosphonium groups.

The novel polymeric products of this invention consist of polymers having appended thereto groups of the formula

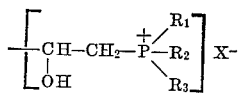

wherein R$_1$, R$_2$ and R$_3$ are alkyl, aryl, aralkyl or wherein two of said R substituents are part of a 5 or 6 membered heterocyclic ring, and X is an anion, usually an anion of a mineral acid (e.g. hydrogen halide such as HCl or HBr), an alkanesulfonic acid (e.g. methanesulfonic acid), an aryl sulfonic acid (e.g. benzene sulfonic acid) or a carboxylic acid having from 2 to 20 carbon atoms. Conversion of the anion into another anion can be effected, if desired, by ion change.

These polymeric products are prepared by the quaternization of trisubstituted phosphines with polymers containing a plurality of 1,2-epoxy groups, the reaction proceeding as follows:

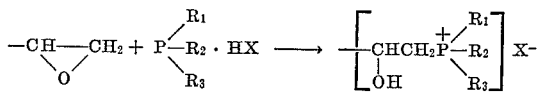

among the trisubstituted phosphines, i.e.

which may be employed in this reaction are, for example.

| | |
|---|---|
| trimethylphosphine | (CH$_3$)$_3$P |
| triethylphosphine | (C$_2$H$_5$)$_3$P |
| diethylpropylphosphine | CH$_3$CH$_2$CH$_2$P(C$_2$H$_5$)$_2$ |
| triisopropylphosphine | [(CH$_3$)$_2$CH]$_3$P |
| triisobutylphosphine | [(CH$_3$)$_2$CHCH$_2$]$_3$P |
| triphenylphosphine | (C$_6$H$_5$)$_3$P |
| P-phenylcyclotetramethylene phosphine | CH$_2$–CH$_2$<br>    \<br>     P–C$_6$H$_5$<br>    /<br>CH$_2$–CH$_2$ |
| P-phenyl-cyclopentamethylene phosphine | CH$_2$–CH$_2$<br>/     \<br>CH$_2$   P–C$_6$H$_5$<br>\     /<br>CH$_2$–CH$_2$ |
| tri-n-propylphosphine | (CH$_3$CH$_2$CH$_2$)$_3$P |

The quaternazation reaction may be carried out under moderate temperature conditions (preferably temperatures from about 20° C. to 90° C.) in organic solvents or, in some cases, in aqueous solvents. The reaction proceeds more readily, if the phosphine is utilized in salt form.

Polymers containing recurring epoxy groupings are well known. Such polymers may be prepared from allyl glycidyl ether, glycidyl acrylate, glycidy methacryate, glycidyl crotonate, butadiene monoxide, vinylcyclohexene monoxide, etc. The molecular weight of the polymers and the number of epoxy groups per molecule is not critical, and both may be varied widely, depending on the end use for the polymeric product.

The resulting polymers having a plurality of quaternary phosphonium groups are characterized by good hydrophilic properties and by good compatibility with the hydrophilic colloids utilized in photographic products, e.g. gelatin and gelatin substitutes. They have also been found to possess a remarkable ability to fix acid dyes. This combination of valuable properties makes the polymers of this invention particularly useful in the photographic field, especially in antihalation layers, filtering layers, and intermediate layers designed to prevent dyes from diffusing from one layer to another. They may be used as mordants for color photographic processes in which a dye is transferred from a dye soaked, hardened gelatin relief matrix to a layer containing a mordant incorporated in a gelatin or another hydrophilic colloid, with or without silver halide. In each of these applications the ability of the polymers of this invention to fix acid dyes and prevent their migration, both laterally within a layer or transversely from one layer to another, permits the preparation of color images with excellent definition.

The polymeric products of this invention may also contain reactive groups other than the quaternary phosphonium groups, e.g. unreacted epoxy groups, and the presence of other reactive groups may be desirable to modify the polymer properties for a particular use.

The following examples are presented to better illustrate the present invention without in any way limiting the scope thereof.

Example 1

100 grams of freshly distilled glycidyl methacrylate monomer are dissolved in 50 ml. of dry acetone, 5 grams of α,α'-azobis(isobutyronitrile) is added, and the mixture is refluxed for 4 hours. After cooling, the polyglycidyl methacrylate is precipitated in diethyl ether and vacuum dried. Yield: about 75 grams.

15 grams of the polyglycidyl methacrylate are dissolved in 150 ml. of acetone. 22.5 ml. of freshly distilled triethylphosphine (prepared from ethylmagnesium bromide and phosphorus trichloride according to the teachings of Ber. 39, 161, B.P. 127–130° C.), 15 ml. of 37% HCl and 25 ml. of water are added, and the mixture is maintained at 65° C. After 15 hours 15 additional ml. of water is added, and the solution is maintained at temperature for 7 additional hours.

The solution is then cooled, and the polymeric mordant is precipitated in acetone and vacuum dried at room temperature. Yield: about 16 grams. Cl⁻ content=6.1%.

100 grams of product contains about 44.5 grams of the units:

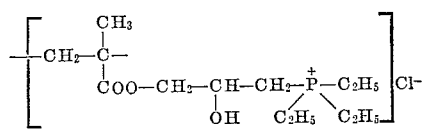

Example 2

15 grams of polyglycidyl methacrylate, prepared as described in Example 1, are dissolved in 150 ml. of acetone, 24 grams of tri-n-propylphosphine (prepared according to the teachings of J. Chem. Soc., 1929, p. 1264, from propylmagnesium bromide and phosphorus trichloride in diethyl ether) and then 15 ml. of 37% HCl and 25 ml. of $H_2O$ are added, and the mixture is maintained at 65° C. After 12 hours 15 additional ml. of $H_2O$ is added to the solution, which is then maintained at the elevated temperature for 8 hours. The solution is then cooled, the polymer is precipitated in acetone, washed with acetone and vacuum dried at room temperature. Yield: 18.2 grams. Cl⁻ content=5.9%.

100 grams of product contains about 48.7 grams of the units:

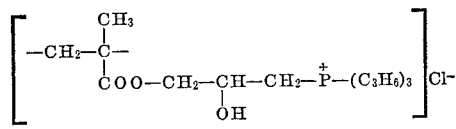

Example 3

To 375 grams of an ordinary positive-type photographic emulsion is added 112 ml. of a 5% solution of the mordant prepared as described in Example 1. The pH of the resulting mixture is adjusted to a value of 4.3–4.4, and 10 ml. of a 4% formaldehyde solution is added. The mixture is then spread on a cellulose acetate base to obtain a dry film having a thickness of 10 microns.

After several days of curing at room temperature the photographic material thus prepared is processed to obtain a colored image by transferring thereto a dye from a relief matrix obtained by pyrogallol tanning development and subsequent removal of the unhardened portions in hot water. The relief matrix is soaked with an aqueous solution of magenta acid dye (C.I. 28160) made acid with acetic acid and placed in contact with the above material soaked in water at 40° C. After about 1 minute the dye is substantially fully transferred, and an image having a high definition is visible.

Example 4

To 20 grams of a photographic grade gelatin dissolved in 350 ml. of water are added the conventional amount of saponin and glycerin and 126 ml. of a 5% alcoholic aqueous solution of the mordant prepared as in Example 1. The pH of the mixture is then adjusted to a value of about 4.5, and 6.0 ml. of a 4% formaldehyde solution is added. The solution thus obtained is then spread as a thin layer on a cellulose acetate base.

The printing of a colored image by means of dye transfer from three relief matrices respectively saturated with yellow, magenta and cyan dyes produces a color image having a high definition.

Example 5

5 grams of gelatin are dissolved in 450 ml. of water. After adding 6 ml. of 2% of saponin and 1.5 ml. of 50% of glycerin solution in water, 22.2 ml. of a 5% solution of the mordant prepared as in Example 1 is added. The pH of the mixture is then adjusted to a value of 4.2–4.3, and 7.5 ml. of an aqueous formaldehyde solution is added. The solution thus obtained is spread as a thin layer on a layer of a positive type silver halide-gelatin photosensitive emulsion.

The product thus obtained, after exposure, development and fixing, is useful as dye-acceptor film. From the photographic viewpoint the product has good sensitometric properties.

Example 6

The procedure of Example 5 is followed, but utilizing 23 ml. of a 5% solution of the product prepared as in Example 2, in place of the product of Example 1. The results were similar to Example 5.

Example 7

7.1 grams of polyglycidyl methacrylate, prepared as described in Example 1, are dissolved in 80 ml. of acetone, 13.1 grams of triphenylphosphine, 1.9 ml. of 37% HCl, and 5 ml. of $H_2O$ are added, and the mixture is refluxed for 24 hours. Finally the solution is filtered and poured into a 1:10 acetonediethyl ether mixture. The recovered polymer is washed with ether and vacuum dried. Yield: 7.5 grams. C⁻ content=2.6.

100 grams of product contains about 32.3 grams of units:

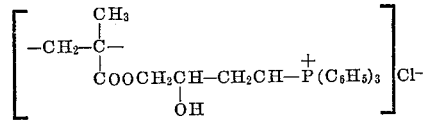

Example 8

To 25 ml. of a 10 weight percent aqueous solution of gelatin containing 0.8 grams of the yellow dye C.I. Acid Yellow 23 (C.I. 19, 140)

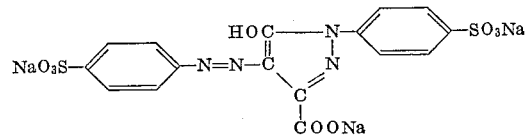

72 ml. of a 5% water-alchol solution of the product of Example 1 and 0.30 grams of chrome alum is added slowly with stirring. The solution thus obtained is then utilized in a conventional three-color photographic material as yellow filter, so as to provide a density of 1.5 in the complementary light.

The embodiments of the invention in which an exclusive property or privilege is claimed are defined as follows:

1. Novel polymeric compounds to which are appended a plurality of groups of the structure

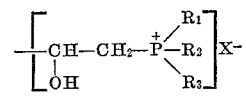

wherein $R_1$, $R_2$ and $R_3$ are alkyl, aryl or aralkyl or any two thereof together form a 5 or 6 member heterocyclic ring, and X is an anion.

2. The polymeric compounds of claim 1 in which $R_1$, $R_2$ and $R_3$ are alkyl.

3. The polymeric compounds of claim 1 in which said X is anion of a mineral acid, an alkanesulfonic acid, an aryl sulfonic acid, or a carboxylic acid having from 2 to 20 carbon atoms.

4. The polymeric compound of claim 1 in which X is halide.

5. A polymeric compound of claim 1 having a plurality of groups of the structure

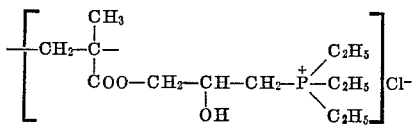

6. A polymeric compound of claim 1 having a plurality of groups of the structure

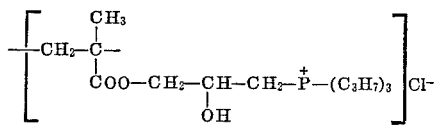

7. A polymeric compound of claim 1 having a plurality of groups of the structure

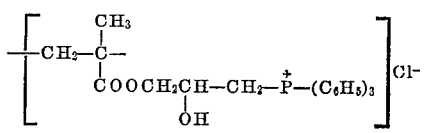

8. A colloidal emulsion having therein a polymeric compound of claim 1.

9. The colloidal emulsion of claim 8 in which said colloidal emulsion is a gelatin emulsion.

10. A film having thereon a layer of gelatin containing a polymeric compound of claim 1 as a mordant.

References Cited

UNITED STATES PATENTS

| | | | |
|---|---|---|---|
| 2,541,027 | 2/1951 | Bradley | 260—2 |
| 2,692,878 | 10/1954 | Cupery | 260—80 |
| 3,140,283 | 7/1964 | Depoorter et al. | 96—84 |
| 3,309,425 | 3/1967 | Gillham et al. | 260—80 |

WILLIAM H. SHORT, *Primary Examiner.*

E. M. WOODBERRY, *Assistant Examiner.*

U.S. Cl. X.R.

260—88.3, 80, 2; 96—57, 84; 260—47; 8—100; 117—145

UNITED STATES PATENT OFFICE
CERTIFICATE OF CORRECTION

Patent No. 3,429,839 February 25, 1969

Simone Franco

It is certified that error appears in the above identified patent and that said Letters Patent are hereby corrected as shown below:

Column 3, line 9, "B.P." should read -- b.p. --; lines 41 to 46, the formula should appear as shown below:

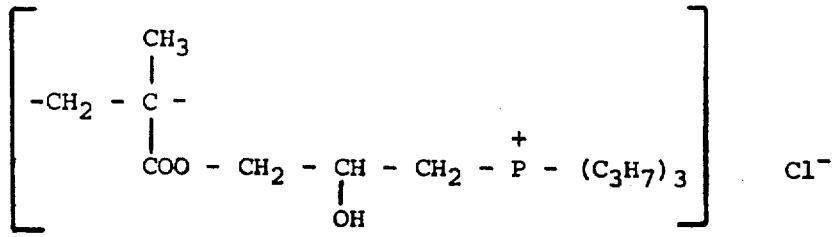

Column 4, line 34, "C⁻" should read -- Cl⁻ --; lines 37 to 42, the formula should appear as shown below:

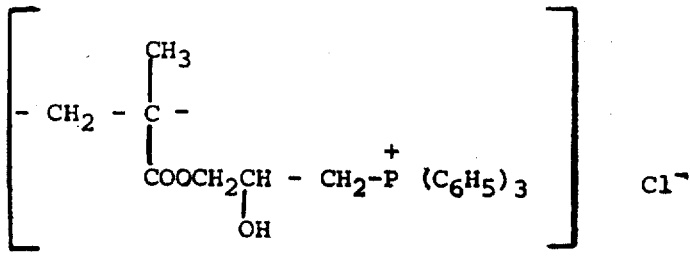

Signed and sealed this 7th day of April 1970.

(SEAL)
Attest:

EDWARD M. FLETCHER, JR.
Attesting Officer

WILLIAM E. SCHUYLER, JR.
Commissioner of Patents